United States Patent [19]
Horst

[11] Patent Number: 5,844,343
[45] Date of Patent: Dec. 1, 1998

[54] AUXILIARY STARTING SWITCHED RELUCTANCE MOTOR

[75] Inventor: Gary Edward Horst, Manchester, Mo.

[73] Assignee: Emerson Electric Co., St. Louis, Mo.

[21] Appl. No.: 767,977

[22] Filed: Dec. 17, 1996

Related U.S. Application Data

[63] Continuation-in-part of Ser. No. 280,077, Jul. 25, 1994.
[51] Int. Cl.$^6$ ............................. H02K 1/14; H02K 19/06; H02K 1/46
[52] U.S. Cl. .......................... 310/184; 310/168; 318/701
[58] Field of Search ..................................... 310/166, 184, 310/186; 318/701, 786

[56] References Cited

U.S. PATENT DOCUMENTS

| | | | |
|---|---|---|---|
| Re. 28,705 | 2/1976 | Hoffmeyer | 310/180 |
| 2,854,596 | 9/1958 | Weixelman et al. | 310/198 |

(List continued on next page.)

FOREIGN PATENT DOCUMENTS

| | | | |
|---|---|---|---|
| 0 573 198 A1 | 5/1993 | European Pat. Off. | H02P 61/02 |
| 3003699 | 1/1991 | Japan | H02P 8/00 |
| 4281390 | 10/1992 | Japan | H02P 007/00 |
| 2159672 | 12/1985 | United Kingdom . | |
| 2167914 | 6/1986 | United Kingdom . | |
| 2275836 | 7/1994 | United Kingdom . | |

OTHER PUBLICATIONS

Miller, *Switched Reluctance Drives* pp. 3–69.
Li, et al., "A Doubly Salient Permanent Magnet Motor Capable of Field Weakening," U. of Wisconsin—Madison, Dept. of Electrical and Computer Eng. (1995).
Llang, et al., "A New Variable Reluctance Motor Utilizing An Auxiliary Commutation Winding," pp. 423–432, IEEE Transactions on Industry Applications, vol. 30 No. 2, Mar./Apr. 1994.
Stephenson and Blake, "The Characteristics,Design and Applications of Switched Reluntance Motors and Drives," PCIM Conference & Exhibition, Jun. 21–24, 1993, Nuremberg, Germany.
Li, et al., "A Doubly Salient Doubly Excited Variable Reluctance Motor," pp. 137–143, U. of Wisconsin—Madison, Dept. of Electrical and Computer Eng. (1993).
Llang, et al., "A New Variable Reluctance Motor Utilizing an Auxiliary Commutation Winding," pp. 219–225, IEEE Industry Applications Society Annual Meeting, Houston, Texas (1992).
Vukosavic and Stefanovic, *SRM Inverter Topologies: A Comparative Evaluation*, IEEE Transactions on Industry Applications, vol. 27, No. 6, Nov./Dec. 1991.

(List continued on next page.)

*Primary Examiner*—Clayton LaBalle
*Attorney, Agent, or Firm*—Arnold, White & Durkee

[57] ABSTRACT

A dynamo-electric machine such as a switched reluctance motor (10). A stator (14) has a central bore (16) and a plurality of inwardly salient poles (18A–18D) extending into the bore. A rotor (22) is mounted on a shaft (24) for rotation relative to the stator. The rotor has a plurality of outwardly salient poles (26A, 26B) extending into the bore. Stator windings (20, 21) are bifilar windings which produce an electromagnetic field when a phase is energized. The bifilar windings return energy to the voltage source when the phase is de-energized. An auxiliary winding (28) is also installed on the stator. The auxiliary winding is energized, when the machine is off, to produce a magnetic field which causes rotation of the rotor to a preferred aligned position relative to the stator poles. This facilitates subsequent starting of the machine. An electrical circuit (30) energizes the auxiliary winding, when the machine is off; and then energizes the stator windings when the machine is started. The circuit de-energizes the auxiliary winding when the stator windings are energized. The auxiliary windings are also effective when used with motors having a stepped air gap (G) between the stator poles and rotor poles, or when the stator has a shifted pole configuration.

20 Claims, 7 Drawing Sheets

5,844,343
Page 2

U.S. PATENT DOCUMENTS

| | | | |
|---|---|---|---|
| 3,204,167 | 8/1965 | Zigler | 318/225 |
| 3,319,104 | 5/1967 | Yasuoka et al. | 313/138 |
| 3,518,473 | 6/1970 | Nordebo | 310/168 |
| 3,564,312 | 2/1971 | Bunea | 310/168 |
| 3,593,051 | 7/1971 | Akbar | 310/166 |
| 3,612,988 | 10/1971 | Wanlass | 323/43.5 R |
| 3,648,206 | 3/1972 | Wanlass | 336/160 |
| 3,679,962 | 7/1972 | Wanlass | 321/18 |
| 3,679,966 | 7/1972 | Wanlass | 323/56 |
| 3,704,402 | 11/1972 | Leitgeb | 318/166 |
| 3,740,632 | 6/1973 | Whitney et al. | 318/289 |
| 3,881,146 | 4/1975 | Wanlass | 321/2 |
| 3,956,678 | 5/1976 | Byrne et al. | 318/138 |
| 3,970,907 | 7/1976 | Meyers | 318/114 |
| 3,995,203 | 11/1976 | Török | 310/163 |
| 4,063,135 | 12/1977 | Wanlass | 318/220 |
| 4,095,149 | 6/1978 | Wanlass | 318/220 |
| 4,132,932 | 1/1979 | Wanlass | 318/795 |
| 4,134,055 | 1/1979 | Akamatsu | 318/696 |
| 4,152,630 | 5/1979 | Wanlass | 318/796 |
| 4,187,457 | 2/1980 | Wanlass | 318/729 |
| 4,228,387 | 10/1980 | Brown | 318/696 |
| 4,321,518 | 3/1982 | Akamatsu | 318/696 |
| 4,338,557 | 7/1982 | Wanlass | 318/729 |
| 4,348,605 | 9/1982 | Török | 310/168 |
| 4,387,326 | 6/1983 | Ray et al. | 318/138 |
| 4,401,933 | 8/1983 | Davy et al. | 318/778 |
| 4,446,416 | 5/1984 | Wanlass | 318/812 |
| 4,453,118 | 6/1984 | Phillips et al. | 318/779 |
| 4,484,114 | 11/1984 | Ebbs | 318/138 |
| 4,489,262 | 12/1984 | Moren et al. | 318/700 |
| 4,628,245 | 12/1986 | Quayle | 322/32 |
| 4,642,543 | 2/1987 | MacMinn | 318/696 |
| 4,670,696 | 6/1987 | Byrne et al. | 318/701 |
| 4,684,867 | 8/1987 | Miller | 318/701 |
| 4,736,151 | 4/1988 | Dishner | 323/224 |
| 4,740,738 | 4/1988 | El-Antably et al. | 318/701 |
| 4,819,460 | 4/1989 | Obadovic | 68/23.7 |
| 4,855,652 | 8/1989 | Yamashita | 318/268 |
| 4,884,185 | 11/1989 | Hubert | 363/56 |
| 4,942,345 | 7/1990 | Horst | 318/254 |
| 5,057,726 | 10/1991 | Mole et al. | 310/67 |
| 5,072,166 | 12/1991 | Ehsani | 318/696 |
| 5,111,096 | 5/1992 | Horst | 310/168 |
| 5,113,113 | 5/1992 | Tepavcevic | 318/701 |
| 5,115,181 | 5/1992 | Sood | 318/701 |
| 5,122,697 | 6/1992 | Horst | 310/67 |
| 5,124,604 | 6/1992 | Swartz | 310/68 |
| 5,187,427 | 2/1993 | Erdman | 323/207 |
| 5,231,342 | 7/1993 | Bahn | 318/696 |
| 5,235,504 | 8/1993 | Sood | 363/53 |
| 5,239,217 | 8/1993 | Horst | 310/51 |
| 5,291,106 | 3/1994 | Murty et al. | 318/375 |
| 5,294,856 | 3/1994 | Horst | 310/181 |
| 5,304,882 | 4/1994 | Lipo et al. | 310/156 |
| 5,319,297 | 6/1994 | Bahn | 318/701 |
| 5,355,069 | 10/1994 | Bahn | 318/701 |
| 5,373,195 | 12/1994 | De Doncker et al. | 307/45 |
| 5,373,223 | 12/1994 | Akagi et al. | 318/722 |
| 5,376,851 | 12/1994 | Lipo et al. | 310/179 |
| 5,376,867 | 12/1994 | Capetti | 318/376 |
| 5,410,203 | 4/1995 | Lürkens | 310/163 |
| 5,424,624 | 6/1995 | Senak, Jr. | 318/701 |
| 5,449,993 | 9/1995 | Davis | 318/701 |
| 5,455,473 | 10/1995 | Lipo et al. | 310/114 |
| 5,459,385 | 10/1995 | Lipo et al. | 318/701 |
| 5,463,299 | 10/1995 | Futami et al. | 318/618 |
| 5,545,938 | 8/1996 | Mecrow | 310/156 |
| 5,598,071 | 1/1997 | Dunfield et al. | 318/254 |

OTHER PUBLICATIONS

Miller, *Switched Reluctance Drives: a Reference Book of Collected Papers*, pp. 320–323, Oct. 1988, Intertec Coommunications Inc. (USA).

D. J. Pulle, "Performance of Split–Coil Switched Reluctance Drive," pp. 318–323, IEE Proc., vol. 135, Pt. B, No. 6 (1988).

Wanlass et. al., "New Directions in Linear Microcircuits," 1968 Wescon Technical Papers, Aug. 20–23, 1968 (U.S.A.).

AUXILIARY STARTING SWITCHED RELUCTANCE MOTOR

CROSS-REFERENCE TO RELATED APPLICATIONS

This application is a continuation-in-part of U.S. patent Application Ser. No. 08/280,077, entitled "Auxiliary Starting Switched Reluctance Motor" by the same inventor, filed Jul. 25, 1994. Applicant hereby claims the benefit of the referenced application and incorporates the disclosure of the referenced application by reference.

BACKGROUND OF THE INVENTION

This invention relates to dynamo-electric machines and, more particularly, to switched reluctance motors (SRM) for use in applications where high starting torques are required and/or where loads having variable torque requirements are encountered.

In my U.S. Pat. No. 5,294,856, 5,239,217, 5,122,697, 5,111,096, and 4,942,345, and in my co-pending patent applications 043,294/08, 175,516/08, and 175,561/08, all of which are assigned to the same assignee as the present invention, I have described various improvements in switched reluctance motors. One problem in certain single-phase switched reluctance motors which still needs to be addressed is that of overcoming the inertia required to start the motor; i.e., producing enough starting torque to start the motor. This problem exists in single-phase reluctance machines because, for such machines: (i) the available torque output of the machine tends to vary significantly with respect to the position of the rotor relative to the stator; and (ii) for certain rotor positions the available torque output is often zero or near zero.

This torque-variation problem can be particularly limiting in applications where high starting torques are required. In such applications, if the rotor happens to come to rest at one of the positions where the available torque is zero or near zero, then it may be impossible to start the motor.

One proposed solution to overcoming the start-up problem associated with single-phase reluctance machines has been to use small permanent magnets to "park" the rotor at a position from which positive starting torque can be developed. In such machines, a permanent magnet is affixed to the stator of a reluctance machine such that, as the rotor slows upon de-energization of the stator winding, the rotor will tend to come to rest at a position where one of the rotor poles is in alignment with parking magnet. FIG. 1 illustrates a reluctance machine 10 utilizing a parking magnet 27 that is coupled to the stator 12 of a reluctance machine.

There are several drawbacks to the permanent-magnet based parking magnet approach discussed above. The strength of the magnetic field generated by the parking magnet will, by necessity, be limited by the size of the permanent-magnet parking magnet. The size of such a magnet will, in turn, be limited by the size of the reluctance machine that will host the magnet, as well as the available space within the stator. In many applications where the load will exert a torque on the rotor, it may be impossible to fit a permanent magnet rotor within the stator of a size sufficient to ensure that the rotor rotates to a position where a rotor pole is in alignment with the parking magnet. In sum, for many applications, the magnetic field generated by parking magnets is simply insufficient to guarantee reliable starting of the motor.

A further limitation with the use of parking magnets is that, in many applications, an external force imposed on the rotor by the load may cause the rotor to be displaced from the ideal parked position before the stator winding is energized. For example, in blender applications, a piece of ice may be lodged against a blade coupled to the rotor before the motor is energized such that the rotor is rotated from the ideal parking position to a position where the available starting torque is insufficient. Thus, reliance on permanent-magnet parking magnets has several drawbacks.

Another proposed solution for overcoming the starting-torque problem associated with single-phase reluctance machines is to use a two-phase switched reluctance motor, for example, in place of a single phase reluctance machine. However, such a solution has associated cost penalties because of the phase switching circuitry required to run a multi-phase machine and the associated sensors (rotor position sensors) such switching circuitry requires.

Yet another solution to overcoming the single-phase reluctance machine starting problem is to: (i) substitute a permanent magnet motor (i.e., a motor with a permanent magnet rotor) for the single-phase reluctance machine; and (ii) position a separate starting winding within the stator of the permanent magnet machine such that energization of the stator causes the permanent magnet rotor to rotate to a position where the magnetic fields of the permanent magnet rotor are in alignment with the magnetic fields established when the separate starting winding is energized. Examples of such a permanent magnet motor system are described in U.S. Pat. No. 4,448,114 to Ebbs and U.S. Pat. No. 3,319,104 to Yasuoka et al. In these permanent magnet motors, a starting winding is energized to produce a magnetic field to interact with permanent magnets on the rotor to place the rotor in a desired starting position. However, this solution has several shortcomings.

First, in such machines including a permanent magnet rotor the starting winding is energized to produce a magnetic field that interacts with the permanent magnets on the rotor to place the rotor in a desired starting position. Thus, in such machines, the starting torque is provided by the interaction of one or more electro-magnets (produced when the starting winding is energize) and the magnetic fields established by the permanent magnet rotor. This reliance on magnetic fields established by permanent magnets for starting torque suffers from many of the limitations discussed above in connection with traditional parking magnets.

Further, in such machines the starting torque is produced by the tendency of the rotor to move to a position where the permanent magnets on the rotor are aligned with electro-magnets of opposing polarity established when the starting winding is energized. Thus, the maximum torque that can be produced in these permanent magnet machines is limited, to a significant extent, by the strength of the rotor permanent magnets. Moreover, the strength of the electro-magnets established when the starting windings of such machines are energized—and thus the maximum starting torque—will necessarily be limited by the reliance on a permanent magnet rotor. As those of ordinary skill in the art will appreciate, permanent magnets tend to become "de-magnetized" when they are placed in the presence of a magnetic field of opposite polarity. Thus, in permanent magnet machines with starting windings, the strength of the magnetic fields established when the starting winding is energized must necessarily be less than the field strength at which the permanent magnets of the rotor begin to become de-magnetized. Accordingly, there is an inherent limitation in such permanent magnet machines with respect to the starting torque that may be produced by a starting winding.

Yet another limitation of permanent magnet machines with starting windings is that the magnetic field or fields established by the starting winding must have a particular magnet orientation to properly interact with the permanent magnets on the permanent magnet rotor. This requirement essentially precludes the use of AC power to energize the starting windings in such machines. Moreover, because the starting winding must be energized by DC power, DC power switching devices, such as semiconductor switches, must be used. Such switches are relatively expensive and can further limit the strength of the magnetic fields established when the starting winding is energized, since the current applied to the starting winding must be below the current rating of the switching devices.

A further limitation of the previously described and other known attempt to overcome the limitations associated with single-phase reluctance machines is that the attempts are primarily focused on the initial starting of the machine. For example, the parking magnets typically only serve to park the motor when at rest and do not tend to increase or otherwise positively affect the torque output of the machine once the machine is started. Similarly, in the permanent magnet machines described above, the starting winding is energized only at start-up and is not used during normal running operation of the machine. These limited uses of the describe starting mechanisms are not believed to fully utilize the torque-producing potential of the machines in which they are used.

It is an object of the present invention to overcome the described and other limitations of the prior art and to provide an improved single-phase reluctance machine. Other objects of the present invention will be apparent to those of ordinary skill in the art having the benefit of this disclosure.

SUMMARY OF THE INVENTION

One exemplary aspect of the present invention involves the provision of an improved dynamoelectric machine; the provision of such a dynamoelectric machine which is a single-phase switched reluctance motor; the provision of such a switched reluctance motor having at least one, and preferably two, auxiliary coils or windings to facilitate starting the motor; the provision of such a motor in which alignment of the rotor enables a phase winding of the motor to produce sufficient torque to start the motor; the provision of such a motor to employ a shifted pole to even out the available torque over the widest angle the auxiliary coils can produce to realign the rotor; the provision of such a motor having a stepped air gap between stator poles and rotor poles; the provision of such a motor in which the auxiliary coils require less copper than the phase winding; and, the provision of such a motor which is a less expensive motor than a two-phase motor because electronic switches and rotor sensors required with two-phase motors are not required.

In accordance with another exemplary embodiment of the present invention generally stated, a dynamo-electric machine such as a switched reluctance motor having a stator assembly and a rotor is provided. The stator has a central bore and a plurality of inwardly salient poles extending into the bore. A rotor is mounted on a shaft for rotation relative to the stator. The rotor has a plurality of outwardly salient poles extending into the bore. Stator windings are installed on the stator; and, when energized, when the motor is running, produce an electro-magnetic field. an auxiliary winding is also installed on the stator. The auxiliary windings is energized, upon start-up or when the rotor becomes "jammed" to produce a magnetic field which causes rotation of the rotor to a preferred aligned position relative to the stator poles. This facilitates subsequent starting of the machine. During start-up an electrical circuit energizes the auxiliary winding initially and then energizes the stator windings when the machine is started. The circuit de-energizes the auxiliary winding when the stator windings are energized. The auxiliary winding is also installable on machines having stepped air gaps and shifted pole constructions.

A method of machine operation to facilitate starting the motor is also disclosed.

BRIEF DESCRIPTION OF THE DRAWINGS

FIG. 4E is a fourth embodiment of the control circuit;

Corresponding reference characters indicate corresponding parts throughout the drawings.

DETAILED DESCRIPTION OF EXEMPLARY EMBODIMENTS

Figure 1:
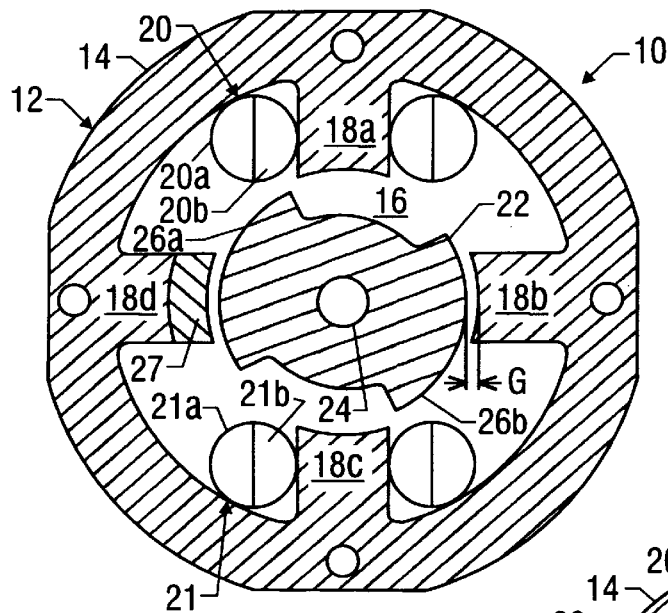
FIG. 1 is a sectional view of a single-phase prior art switched reluctance motor.
Figure 2:
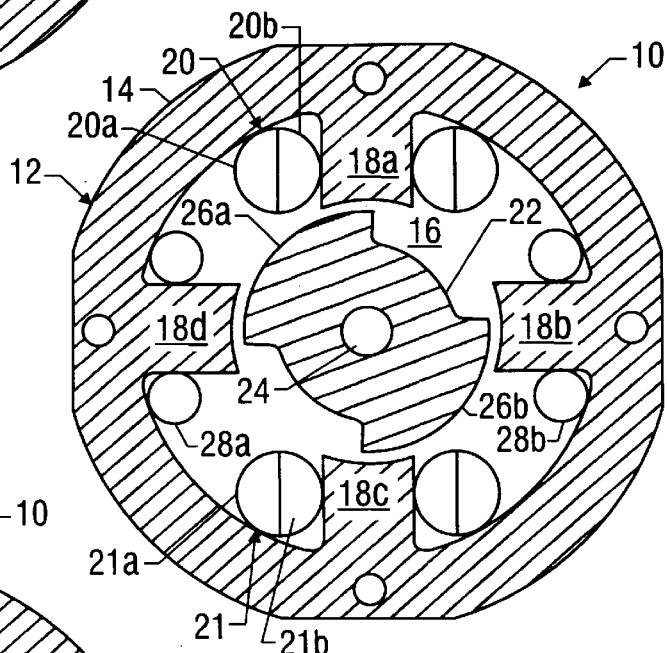
FIG. 2 is a sectional view of a single-phase switched reluctance motor of the present invention.

Turning to the drawings and, in particular, to FIG. 2, a reluctance machine 10, constructed according o the teachings of the present invention is shown. In general, machine 10 includes a stator 14 defining four inwardly-projecting stator poles 18a, 18b, 18c and 18d that define a central bore. Positioned within the central bore is a rotor 22 that defines two outwardly projecting rotor poles. The rotor 22 is mounted on a shaft 24 and is free to rotate with respect to the stator. Both the stator 14 and the rotor 22 may be formed from a stack of substantially identical stator or rotor laminations of a paramagnetic material such as steel using conventional techniques. The construction of the stator 14 and the rotor 22 will be well within the ability of one of ordinary skill in the art having the benefit of this disclosure.

While stator 14 is illustrated in FIG. 2 as having four poles, and the rotor 22 as having two poles, it will be understood by those of ordinary skill in the art that a different number of stator poles and rotor poles can be used, and different combinations and multiples of poles, without departing from the scope and spirit of the present invention. Moreover, in the example of FIG. 2, the rotor poles are illustrated as defining an air-gap G that is relatively uniform. Alternate embodiments are envisioned wherein rotors defining "stepped" or non-uniform air-gaps are utilized to construct a machine according to the teachings of the present invention. On such embodiment will be discussed below in connection with FIG. 6.

In the embodiment of FIG. 2 a single-phase winding is positioned within the stator 14. In the exemplary embodiment, the single-phase winding comprises two winding coils 20 and 21 with winding coil 21 being positioned around stator pole 18*a* and with coil 21 being positioned about stator coil 18*c*. Winding coils 20 and 21 may be connected in either parallel or series to form a single-phase winding. In the exemplary embodiment of FIG. 2, each of the winding coils 20 and 21 is a bifilar winding coil formed from respective coil sections 20*a* and 20*b*, 21*a* and 21*b*. The bifilar coils may be coupled to an appropriate drive circuit to return stored energy back to a DC bus when the single phase winding is de-energized.

To assist in the starting and operation of the single-phase reluctance machine of FIG. 2, and auxiliary winding 28 is also positioned within the stator. In the example of FIG. 2, the auxiliary winding 28 comprises two winding coils 28*a* and 28*b* which are installed on stator assembly 12. Specifically, as shown in FIG. 2, winding 28*a* is installed on stator pole 18*d*, and winding 28*b* on stator pole 18*b*. These are opposed stator poles, and for the four pole construction of stator 14, the stator windings and auxiliary windings are installed on alternate poles. Although FIG. 2 illustrates an example utilizing a two-coil auxiliary winding 28, alternate embodiments are envisioned wherein the auxiliary starting winding 28 comprises only a single coil.

Importantly, and as described hereinafter, the auxiliary winding 28 may be energized at times when the single-phase winding that normally drives machine 10 is not energized to produce a magnetic field that tends to cause rotor 22 to rotate to a preferred aligned position relative to the stator poles where the poles of rotor 22 are aligned with the stator poles that ere energized by the auxiliary winding 28 (e.g., stator poles 18*b* and 18*d*). More specifically, energizing the auxiliary windings 28 tends to cause the rotor 22 to rotate to the position where the inductance of the auxiliary winding is maximized. Thus, in the machine of FIG. 2, the mechanism for causing the rotation of the rotor 22 upon energization of the auxiliary winding is the tendency of the rotor 22 to move into a position where the inductance of the energized auxiliary winding is maximized. This reluctance torque is caused by the interaction of a magnetic field with a paramagnetic rotor, and not the interaction between a magnetic field and a permanent magnet or the interaction between two permanent magnets as with permanent magnet motors. Accordingly, the limitations associated with the use of permanent magnets (e.g., demagnetization concerns, costs, sizing) are not associated with the novel machine of the present invention.

Figure 3:
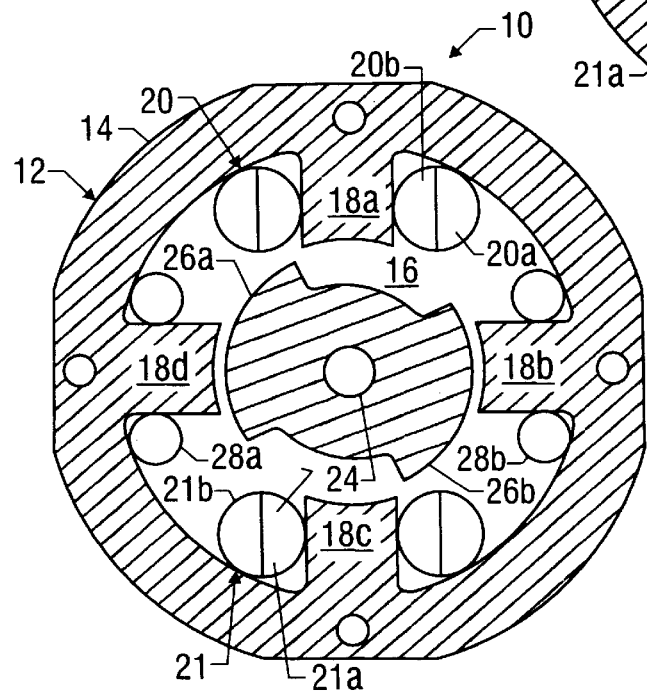
FIG. 3 is a view similar to FIG. 2, but with an auxiliary coil of the motor energized.

As shown in FIG. 3, energization of the auxiliary windings aligns the rotor poles with the stator poles about which the auxiliary windings are installed. Positioning the rotor as shown in FIG. 3, while the motor is otherwise "off" (i.e., the stator winding is not being energized), facilitates subsequent starting of the motor. With respect to winding 28 and coils 28*a*, 28*b*, it will be noted that in the exemplary embodiment of FIG. 2 the coils comprising auxiliary winding 28 are illustrated as having a smaller cross-section than the coils 20 and 21 comprising the single-phase winding. This is exemplary only, as other embodiments are envisioned wherein the cross-section of the coil or coils comprising the auxiliary starting winding are greater than or equal to the coils comprising the single-phase winding. FIGS. 4A–4E illustrate various embodiments of a control circuit 30 that may be used to control the energization of the reluctance machine of FIG. 2. Each embodiment 30*a*–30*d* of the illustrated control circuit is for energizing the auxiliary winding when motor 10 is "off" (i.e., the single-phase winding is not being energized), and for energizing the stator windings 20*a*, 20*b* when motor 10 is operating normally (e.g., the rotor is rotating at some rate of rotation). In each instance, circuit 30 de-energizes the auxiliary winding 28 prior to, or when, the stator winding is energized.

In FIGS. 4A–4D, the coils 20 and 21 of the single-phase stator winding are shown as being connected in parallel and the coils 28a and 28b of the auxiliary winding 28 are illustrated as being connected in series, although other connection schemes are possible as described above. A semiconductor switch Q1, such as a power MOSFET, a BJT, IGBT or the like, is connected in series with one of the coil portions (e.g., 20*a*, 21*a*) from each of the coils comprising the single-phase stator winding and a diode D1 is series connected with the other coil portions (e.g., 20*b*,21*b*) of each coil comprising the single phase stator winding. In each instance illustrated in FIGS. 4A–4D, a DC bus capacitor C1 is connected across the DC output of a rectifier circuit, which may be a full wave rectifier, to smooth the DC bus voltage and to absorb energy returned to the DC bus as the windings in reluctance machine 10 are de-energized.

Figure 4A:
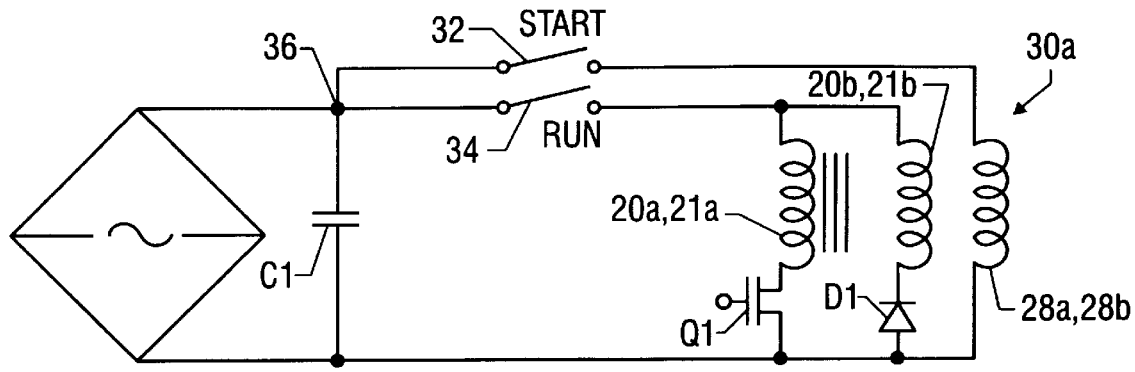
FIG. 4A is a schematic of an electrical control circuit used with the motor to start the motor.

Turning first to FIG. 4A, a pair of switches 32, 34 are interposed between the power source and the respective winding circuits. The switches may be mechanical switches, relays, or semiconductor switching devices under the control of appropriate control circuitry. The switches 32, 34 may also be under manual control.

In the embodiment of FIG. 4A, switch 32 is a normally open switch which, when closed, routes DC power from the DC bus, through a common point 36 with switch 34, through switch 32, to the auxiliary winding 28. This energizes the auxiliary winding to impart torque on the rotor 22 which will tend to cause to rotor to rotate the preferred aligned position of FIG. 3. This switch 32 may be activated initially-upon start-up of the machine 20.

According to one method for starting machine 10, after switch 32 is energized from a predetermined time period (e.g., a time period determined by a control timer), switch 32 is then opened, thus de-energizing the auxiliary winding 28, and switch 34 is closed to energize the single-phase stator windings. According to this method switch 34 will remain closed during the entire time the motor is running (e.g, the rotor is rotating); and will be opened when the motor is stopped.

Those of ordinary skill in the art will appreciate that, although switch 34 remains closed while the rotor is rotating, the energization of the single-phase winding will not be continuous but will vary from an energized state to a de-energized state according to the switching of the switching device Q1. The switching device Q1 will, in turn, be controlled by a switched reluctance controller (not illustrated) that monitors the position of rotor 22 and switches on or off the single-phase winding to promote rotation of the rotor in the desired direction. Alternate embodiments are envisioned where the position of the rotor is not monitored, but where a controller controls the switching of device Q1 such that a varying magnetic field is established in the stator and where the rotor tends to rotate in synchronism with this varying magnetic field. Control circuits form implementing such switched reluctance control or synchronous control of reluctance machine 10 are well-known in the art and therefore are not further discussed herein.

Figure 4B:
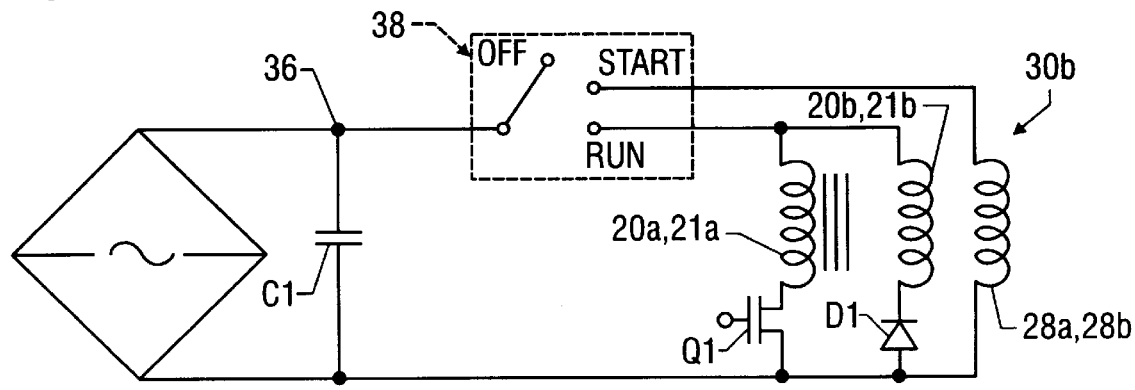
FIG. 4B is an alternate embodiment of a control circuit for starting the motor.

FIG. 4B illustrates an alternate control circuit 30b for controlling the energization of the machine 10 wherein the dual switched 32 and 34 are replaced with a single, multi-position switch 38. Switch 38 is, for example, a three position switch having a first and motor "off" position in which neither the stator windings nor auxiliary windings are energized. The switch has a second and motor "start" position in which the auxiliary windings 28a, 28b, but not the stator windings 20 and 21, are energized. Finally, the switch has a third and motor "run" position in which auxiliary windings are de-energized, and the stator windings are energized. The user of the motor, to start the motor, turns the switch from its "off" to its "start" position. This effects alignment of rotor 22 as previously discussed. When the user then turns the switch to "run", the motor should readily start and run for so long as the user intends.

Figure 4C:
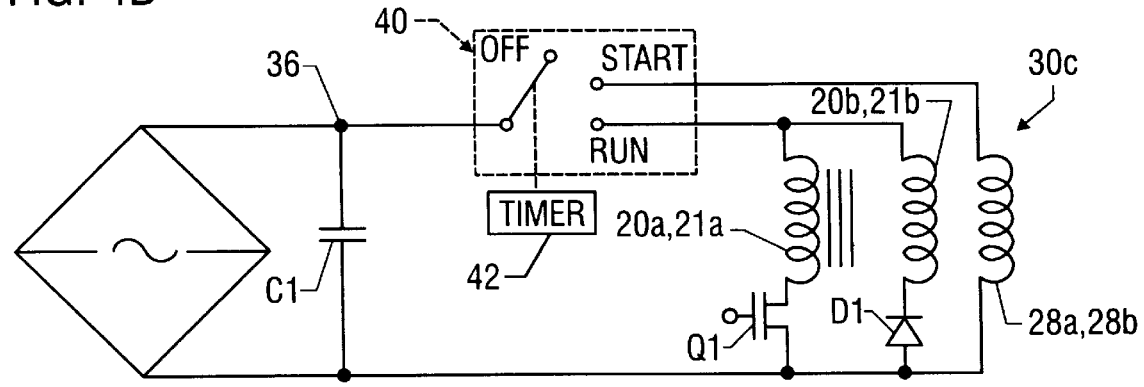
FIG. 4C is another alternate embodiment of the control circuit.

FIG. 4C illustrated yet a third embodiment of a control circuit 30c that may be used to control machine 10. In this embodiment the control circuit 30c has a multi-position switch 40 which is similar to switch 38. Control circuit 30c further includes a timer 42 which sequentially steps switch 40 from its 'off' through its 'start', to its "run" position in a timed sequence. Accordingly, the user need only activate the timing means for the timing means to automatically energize the auxiliary windings for a period sufficient for the rotor to be properly be aligned for starting, and then automatically de-energize the auxiliary windings, and energize the stator windings.

Figure 4D:
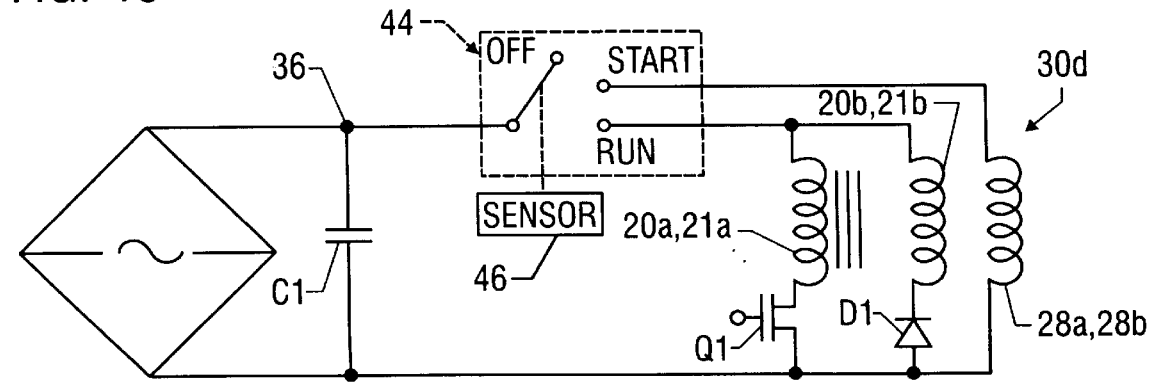
FIG. 4D is a third alternate embodiment of the control circuit.

FIG. 4D illustrates yet a fourth exemplary control circuit 30d for controlling the energization of machine 10. This embodiment includes a switch 44 is again similar to switch 38. Control circuit 30d further includes a sensor 46 which sequentially steps switch 44 from its "off" through its "start", to its "run" position. Whereas timer 42 automatically stepped switch 40 in a timed sequence, sensor 46 steps the switch from its "start" to its "run" position, as a function of the sensed rotor position. Thus, the user first moves switch 44 from "off" to "start", energizing the auxiliary windings. When the rotor is moved to its FIG. 3 position, as previously described, sensor 46 detects that the rotor has attained this position. The sensing means output indicating the rotor is now at its preferred aligned position automatically sequences the switch from its "start" to its "run" position, again to effect energization of the stator windings as previously described. Sensor 46 may be any of a number of rotor position sensors such as a Hall effect sensor without departing from the scope of the invention.

In each of FIGS. 4A–4C, separate "run" and "start" switches were provided. Such separate switches are not necessary and it will be apparent to those of ordinary skill in the art having the benefit of this disclosure that alternate switching arrangements can be used. For example, the series connection of the coils of the main single-phase winding and the switching device Q1, and the series connection of the coils and diode D1, can be connected directly across the DC buss. One exemplary embodiment along these lines is illustrated in FIG. 4E. In this embodiment, the switching device Q1 may be controlled to start-up and control the machine. In the exemplary embodiment of FIG. 4E, the auxiliary winding 28 is coupled in series with a switchable control device 50, which may be a relay, and this series connection is coupled across the DC bus. By suitably controlling the device 50, the auxiliary winding 28 may be appropriately energized.

Figure 5:
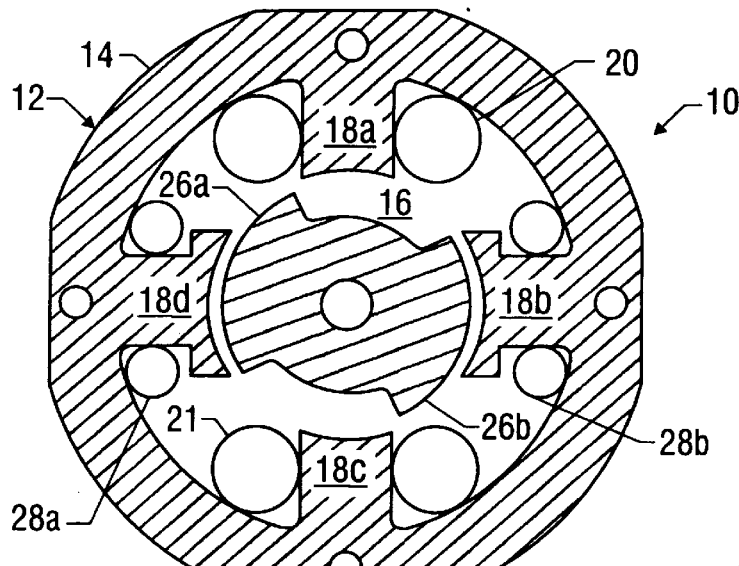
FIG. 5 illustrates an alternate auxiliary winding embodiment in which more copper is made available for the primary stator windings.

In the exemplary machine of FIG. 2, all four of the stator poles defined by the stator are substantially identical and have substantially identical pole faces. Alternate embodiments are envisioned wherein the stator poles about which the coils of the auxiliary winding are placed are modified such that the width of such stator poles up to the pole face is reduced such that the stator pole forms a "T." One example of such an alternate embodiment is illustrated in FIG. 5 where material is "removed" from the base portions of stator poles 18b and 18d such that, while the pole faces (or pole arcs) of the stator poles 18b and 18d is the same as the stator poles 18a and 18c, the base of stator poles 18b and 18d is less than that of stator poles 18a and 18c. The use of such reduced-base stator poles is advantageous in that the coils from the auxiliary winding 28 surrounding such poles do not take up as much space in the inter-pole slot between the stator pole about which the coil of the auxiliary winding is positioned (e.g., 18d) and the stator pole about which the coil of the single-phase winding is positioned (e.g., 18a). Accordingly, there is more space in this inter-pole slot for the coil of the single-phase winding to fill and thus the cross-section of the coils of the single-phase winding for the machine of FIG. 5 (and thus the total ampere-turns and torque output generated by the winding) may be increased over that possible with machines like machine 10 of FIG. 2. Accordingly, the use of reduced-base stator poles as illustrated in FIG. 5, allows for a large single-phase winding and thus for increase average running torque.

Figure 6:
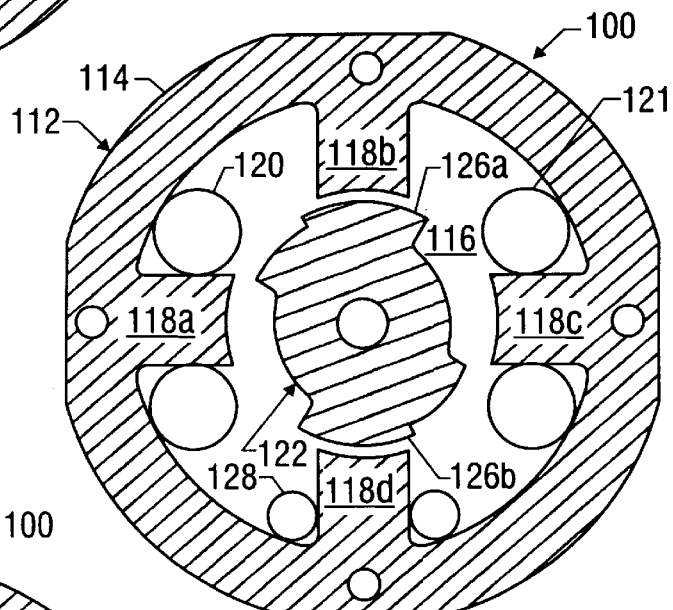
FIG. 6 is a sectional view of the motor of FIGS. 2 and 3 with stepped rotor poles.

FIG. 6 illustrates an alternate embodiment of a dynamo-electric machine 100 constructed according to the teachings of the present invention that utilized a stepped air-gap rotor. Again, the machine is a single-phase switched reluctance motor. The motor has a stator assembly 112 including a stator 114. The stator has a central bore 116 and a plurality of inwardly salient poles (118a–118d) extending into bore 116. As with motor 10, although stator 114 is shown to have four poles, it may have more than that number. The stator further includes stator windings 120, 121 installed on opposed stator poles 118a, 118c.

A rotor 122 is mounted on a rotor shaft 124. The rotor is disposed in bore 116 for rotation relative to the stator assembly and the includes respective poles 126a, 126b which have a stepped outer face so to form a stepped air gap with the corresponding stator poles. As before, while rotor 122 has only two rotor poles, it could have more than two poles. To aid in starting the motor, an auxiliary winding 128 is installed on stator pole 18d. Unlike the rotor pole construction of FIGS. 2, the rotor poles 126a, 126b have a stepped outer face to create the stepped air gaps between the respective stator and rotor poles. As those of ordinary skill in the art will appreciate, the use of such a stepped air-gap will alter the torque vs. rotor position profile of the machine from that available with a constant air-gap machine and thus tend to ensure that the machine runs in one direction only and also increase the overall performance of the machine by, e.g., reducing torque ripple. Again, an auxiliary winding 128 is used for starting the motor as described hereinabove. Unlike the examples of FIGS. 2 and 5, in the example of FIG. 6, the auxiliary winding 128 comprises only a single coil 128.

Figure 7:
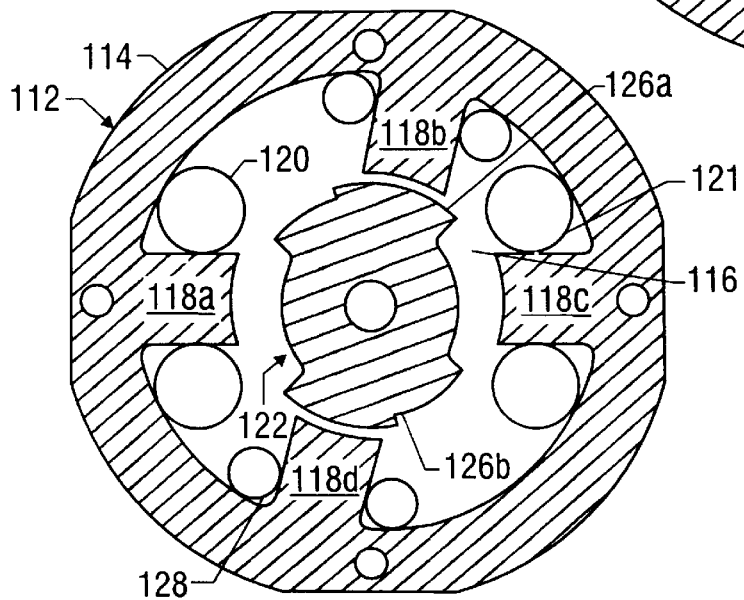
FIG. 7 is a sectional view of the motor with a shifted stator pole construction.

A shifted pole switched reluctance motor is described in my U.S. Pat. No. 5,294,856, the disclosure of which is hereby incorporated herein by reference. One advantage of a shifted pole motor is that it also aids in starting the motor. Such a motor construction, used in accordance with the present invention is shown in FIG. 7. In FIG. 7, both of the stator poles on which auxiliary windings are installed are shifted with respect to the stator poles on which the main stator windings are installed. Again, switching between the auxiliary windings and main windings to effect efficient starting of the motor is as above described.

Figure 8:
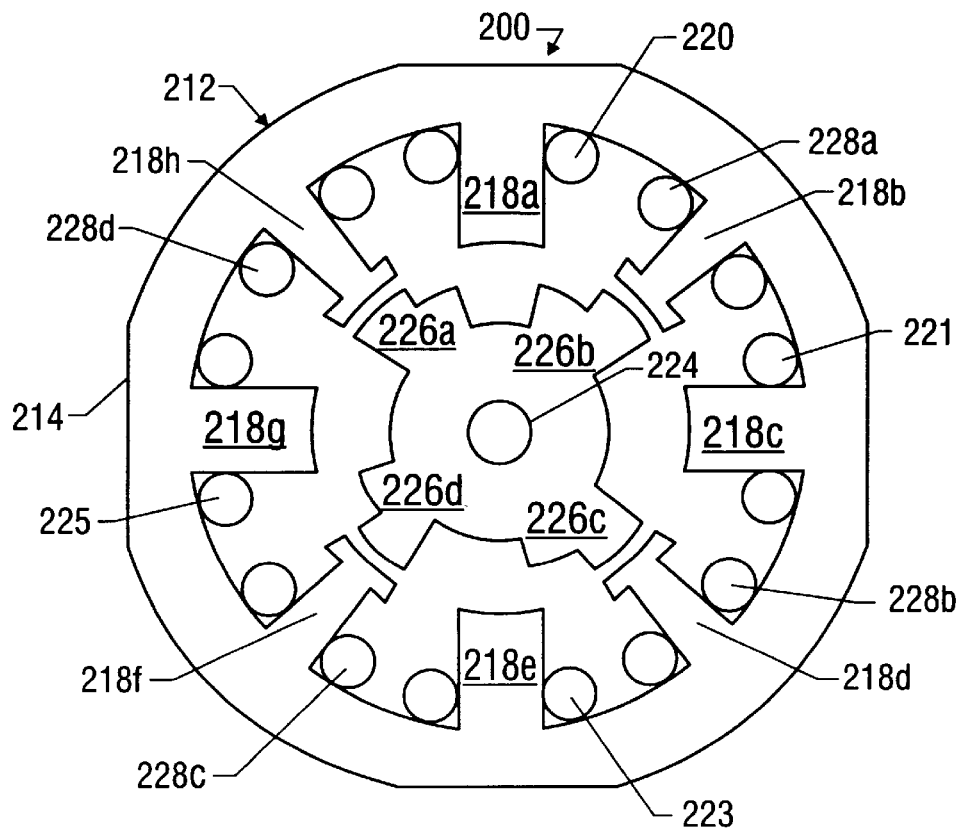
FIG. 8 is a sectional view of another embodiment of the motor.

The motor configurations previously described represent 2:2 motors or motors having 2 active stator poles (stator poles energized by the single-phase winding) and 2 rotor poles. In FIG. 8, a 4:4 motor 200 is shown. This motor has a stator assembly 212 including a stator 214 with stator teeth 218a–218h. A rotor 222 mounted on a rotor shaft 224 has salient rotor teeth 226a–226d. Motor 200 has a single-phase main stator winding comprising coils 220, 221, 223, and 225 and an auxiliary windings 228 comprising coils 228a–228d. Operation of the motor is similar to that of the motors previously described. Motor 200 illustrates that the present invention is useful with motors whose stator pole/rotor pole ratio of 2(n):2(n) where n is a positive whole integer.

Figure 9:
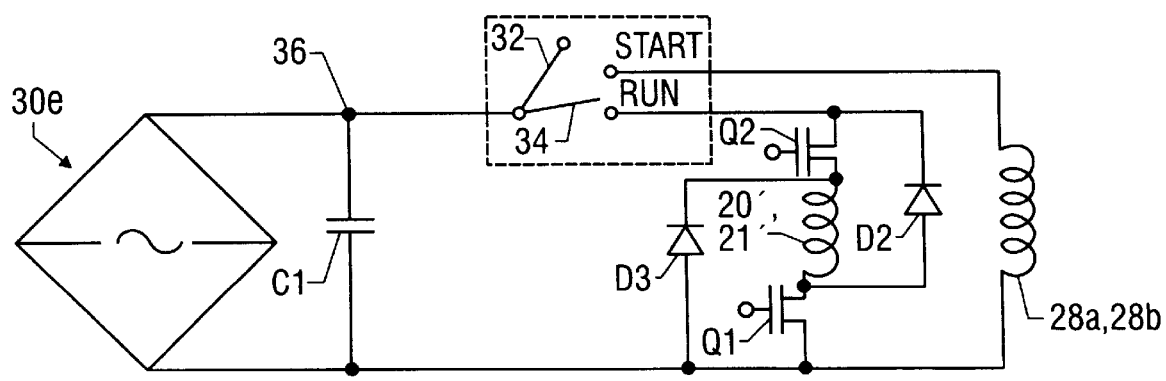
FIG. 9 is a schematic of an alternate embodiment.

FIG. 9 illustrates a control circuit 30e similar to that in FIG. 4A, except for windings that are non-bifilar windings. Now, stator windings 20', 21' are series connected as are auxiliary windings 28a, 28b. A second semiconductor switch Q2 is interposed between RUN switch 34 and the stator windings. A diode D2 is connected in parallel with switch Q2 and the series connected stator windings. Another diode D3 is connected across the stator windings and switch Q1. Operation of the control circuit 30e is such that windings 20', 21' do not now have to be bifilar windings in order to return energy to the DC bus.

Figure 10A:
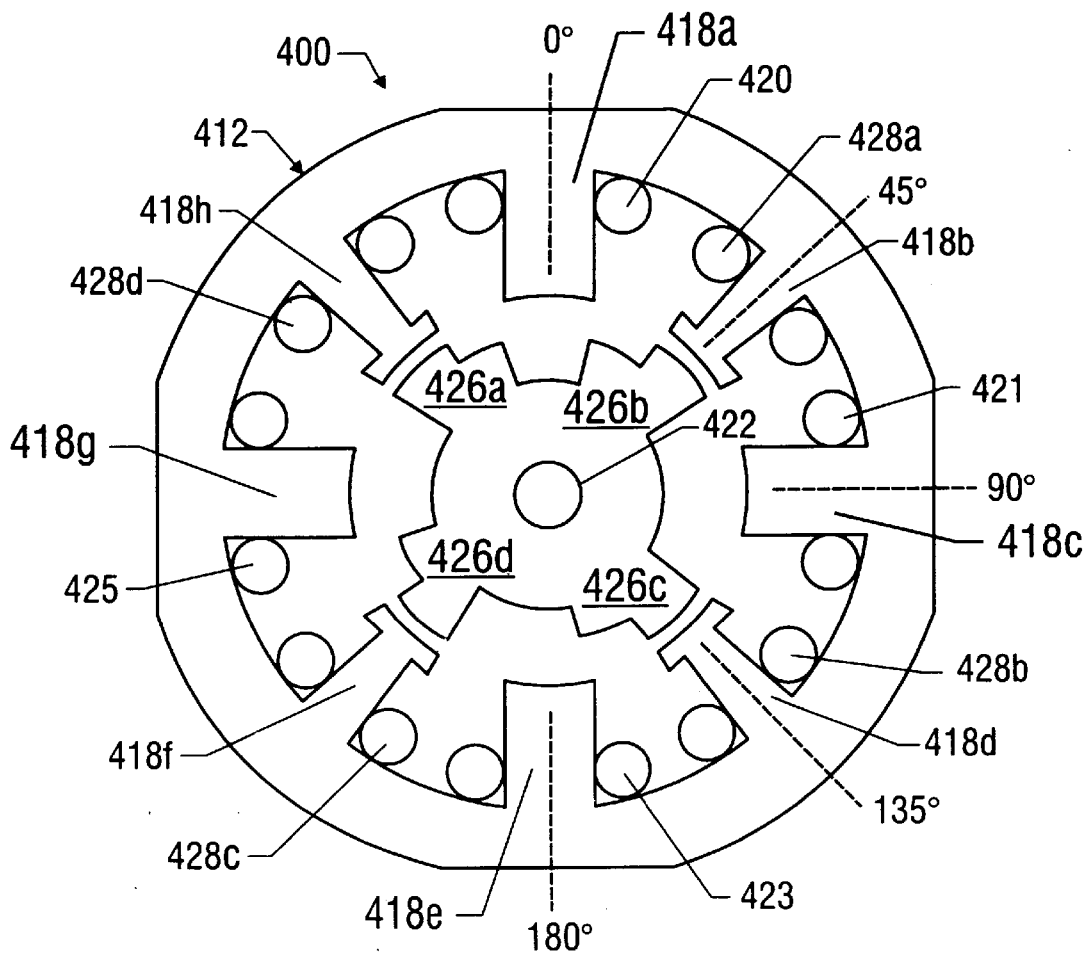
FIG. 10A is a sectional view of another embodiment of the motor that illustrates the position of the rotor relative to the stator.

In many applications, e.g., blender applications, the greatest load impressed on the rotor is at startup (e.g., before the ice in the blender is broken or placed in movement). In such applications the load is such that after the initial movement of the load is accomplished (e.g, the ice is moved from a "jammed" position), the load imposed on the rotor is reduced. In such embodiments, thus, it is desirable to have the starting torque of the machine be greater than the average running torque of the machine. Such a unique starting characteristic is possible with the machine of the present invention. FIG. 10A illustrates a 4:4 motor 400 constructed according to the teachings of the present invention. This motor has a stator assembly 412 including a stator 414 with stator teeth 418a–418h. A rotor 422 mounted on a rotor shaft 424 has salient rotor teeth 426a–426d. Motor 400 has a single-phase main stator winding comprising coils 420, 421, 423, and 425 and an auxiliary winding comprising 428a–428d. Operation of the motor is similar to that of the motors previously described.

Figure 10B:
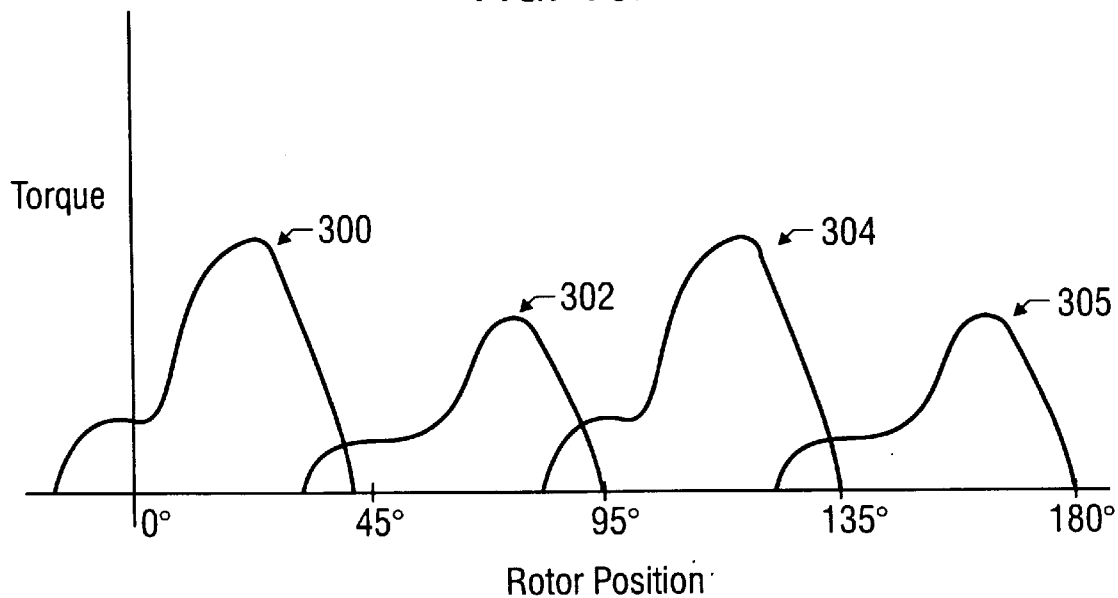
FIG. 10B is a graph of the torque created versus the position of the rotor.

FIG. 10B is provides a output torque vs. rotor position profile for the exemplary machine of FIG. 10B. The first and third curves 300 and 304 represent the torque that will be imparted to the rotor when the auxiliary winding is energized for various rotor positions. The second and fourth curves 302 and 305 represent the torque created by the stator winding when energized for various rotor positions. As the graph of FIG. 10B illustrates, the peak magnitude of the torque imposed on the rotor by the auxiliary windings is greater than the peak torque magnitude obtainable by energization of the stator.

From the curve of FIG. 10B it may be noted that the machine of FIG. 10A is particularly suited for applications where it is beneficial for the starting torque to be greater than the net average running torque.

There are two general ways for constructing and operating the exemplary machine of FIG. 10A such that the peak torque magnitude available from energization of the auxiliary starting winding is greater than that available from energization of the main single-phase winding. Each is described below.

As those of ordinary skill in the art having the benefit of this disclosure will appreciate, in general, the torque output produced by a winding in a reluctance machine will be proportional to amount of flux that flows through the winding when it is energized. One factor that significantly impacts the amount of flux flowing through a winding in a reluctance machine is the number of "ampere-turns" associated with that winding. The "ampere-turns" associated with a winding are, in general, directly proportional to the magnitude of the current flowing in the winding (the amps) multiplied by the number of conductors associated with the winding that extend in a direction parallel to the shaft of the rotor (the turns). In general, the greater the number of ampere-turns associated with a given winding, the greater the torque produced when that winding is energized.

Accordingly, for the auxiliary winding to have a peak torque magnitude that is greater than that of the main single-phase winding the ampere-turns of the auxiliary winding must be greater than those of the main single-phase windings.

The first approach to ensuring that the number of ampere turns of the auxiliary winding is greater than the number of ampere turns of the stator winding is to energize the windings with the same peak current (same amps) and increase the size of the coil or coils used to construct the auxiliary winding such that the coils of the auxiliary winding are greater than those of the main single-phase winding. While this approach is feasible, and may be desired in applications where an extremely high starting torque is required, it is not optimum because it may require a minimization in the size of the main stator winding and thus a reduction in the average running torque of the machine. As discussed above, the coils of the auxiliary winding share slots with the coils of the main single-phase winding such that (assuming complete slot fill) any increase in the size of the auxiliary coils must be offset by a reduction in the size of the coils of the main single-phase winding.

As an alternative to increasing the size of the auxiliary winding, the total number of ampere-turns associated with the auxiliary winding can be increased by simply increasing the current applied to the auxiliary winding above that provided to the main stator winding. Thus, if the differential in the applied peak current is great enough, the ampere-turns of the auxiliary winding can be substantially greater than those of the main single-phase winding even if the number of turns of the auxiliary winding is less than that of the main winding.

Figure 11:
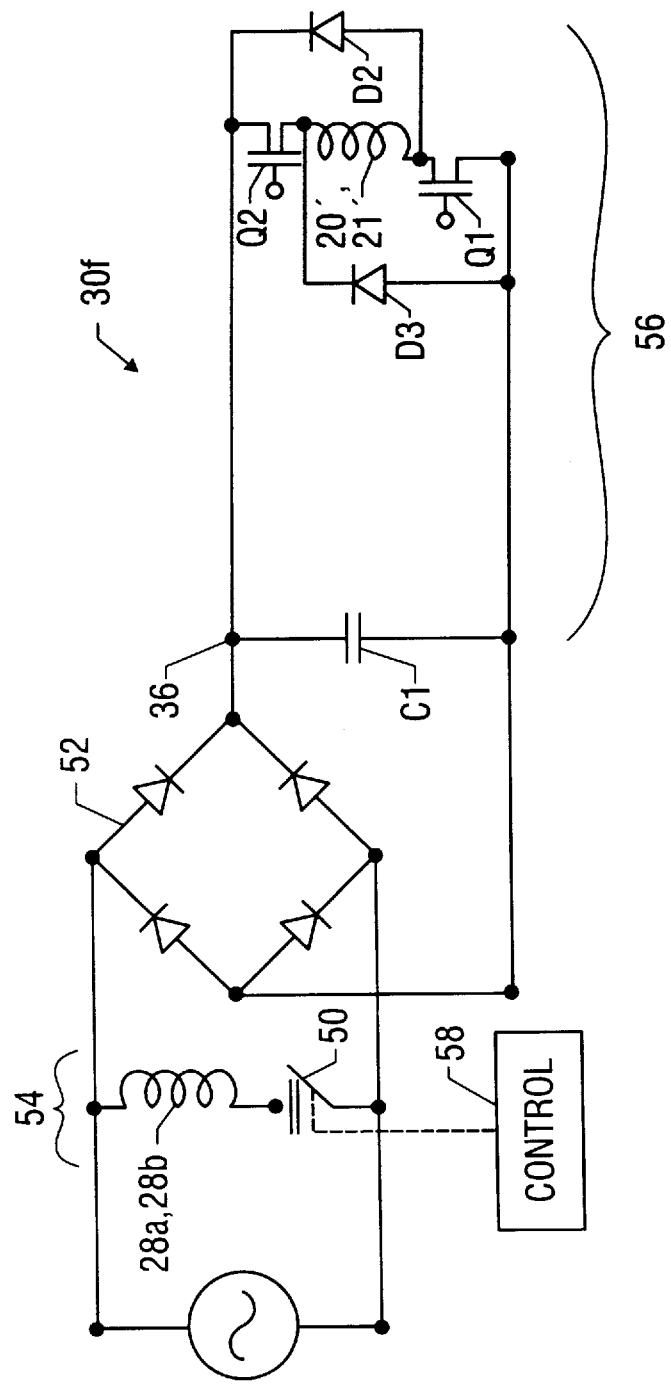
FIG. 11 is a schematic of an alternative embodiment of the control circuit; and, FIG. 12 is an illustration of a blender utilizing a reluctance machine constructed according to the teachings of the present invention.

One exemplary circuit 30f for energizing the reluctance machine of FIG. 10A such that the peak energizing current applied to the auxiliary winding is greater than that applied to the main stator winding is illustrate in FIG. 11.

In control circuit 30f the auxiliary winding 28 is connected to an AC power source. This is significantly different from the previously decried control circuits 30 where the auxiliary winding is powered from the same DC bus that is used to drive the main stator windings. AC power may be used to energize the auxiliary winding because of the nature of the interaction between the magnetic field established when the auxiliary winding and the rotor. As discussed above, the mechanism that causes the rotor to tend to rotor to a position where rotor poles are aligned with the stator poles energized when the auxiliary winding is energized is a reluctance mechanism where the rotor will tend to rotate to a position where the inductance of the auxiliary winding is maximized. This mechanism thus, does not rely upon the interaction of a permanent magnetic field on the rotor and does not rely upon the orientation of the magnetic field established when the auxiliary winding is energized. Accordingly, regardless of whether the auxiliary winding is energized with positive current, negative current, or alternating current, the rotor will tend to rotate to a position where poles of the rotor are in alignment with the poles energized by the auxiliary starting winding.

In the exemplary embodiment of FIG. 11 a mechanical relay 50 controls the application of the AC power to the auxiliary winding 28. The use of a rely is significant in this exemplary embodiment because it is relatively inexpensive to obtain a mechanical relay that is rated to handle the full magnitude of the AC power applied to the motor system. Thus, unlike semiconductor switching devices, the use of relay 50 both allows for a low-cost method of controlling the application of AC power to the auxiliary winding and allows for the application of the full magnitude of available AC power to the auxiliary winding.

In the exemplary circuit of FIG. 11 a control 58 is connected to the relay 50. A full wave rectifier 52 is connected between the auxiliary winding portion of the circuit 54 and the stator winding portion of the circuit 56. The stator winding portion 56 of control circuit 30f is essentially the same as the stator winding portion of control circuit 30e shown in FIG. 9.

In the exemplary embodiment of FIG. 11, the control 58 will, upon start up, operate in a manner akin to the control implemented by the timer 42 and the sensor 46 of FIGS. 4C and 4D. Upon start up, the control 58 may close the relay to energize the auxiliary winding with AC power for a predetermined period of time or until the rotor has rotated to an appropriate rotor position. Alternate embodiments are envisioned wherein the relay 50 is replaced with switches that operate in a manner akin to switched 32 and 38 of FIGS. 4A and 4B.

In addition to providing starting torque, the control 58 of FIG. 11 may be used to help "un-jam" the rotor in the event that the load imposed on the rotor temporarily halts rotation on the rotor. For example, if the motor of FIG. 11 is used to drive a blender the ice may align in a jammed position. For such applications, the control 58 may be coupled to the device used to sense the position of the rotor. If, while the stator winding is being energized, the control 58 determines that the rotor is not rotating (e.g., no change in rotor position) the control 58 can close the relay 58 for a predetermined time period to impart an "un-jamming' torque on the rotor in an attempt to clear the jam and enable the rotor to rotate. In such an embodiment, the control 58 can repeat the application of un-jamming pulses to the relay until the rotor is un-jammed or until a predetermined number of pulses have been applied to the relay. Thus, in this embodiment, the auxiliary windings are used not only to position the rotor in a preferred starting position, but also to provide greater torque than the torque produced by the stator windings to alleviate problems caused by insufficient torque.

In the embodiment of FIG. 11, the controller 58 may also utilize the auxiliary winding 28 to help quickly stop rotation of the rotor when the stator windings are de-energized. For example, upon de-energization of the main stator winding, the auxiliary winding can be energized to essentially "brake" the rotor and bring the rotor to a preferred stopping position. This use of the auxiliary winding has particular application to food processors and blenders where it is desirable to quickly stop the rotation of a blade or chopping member.

Figure 12:
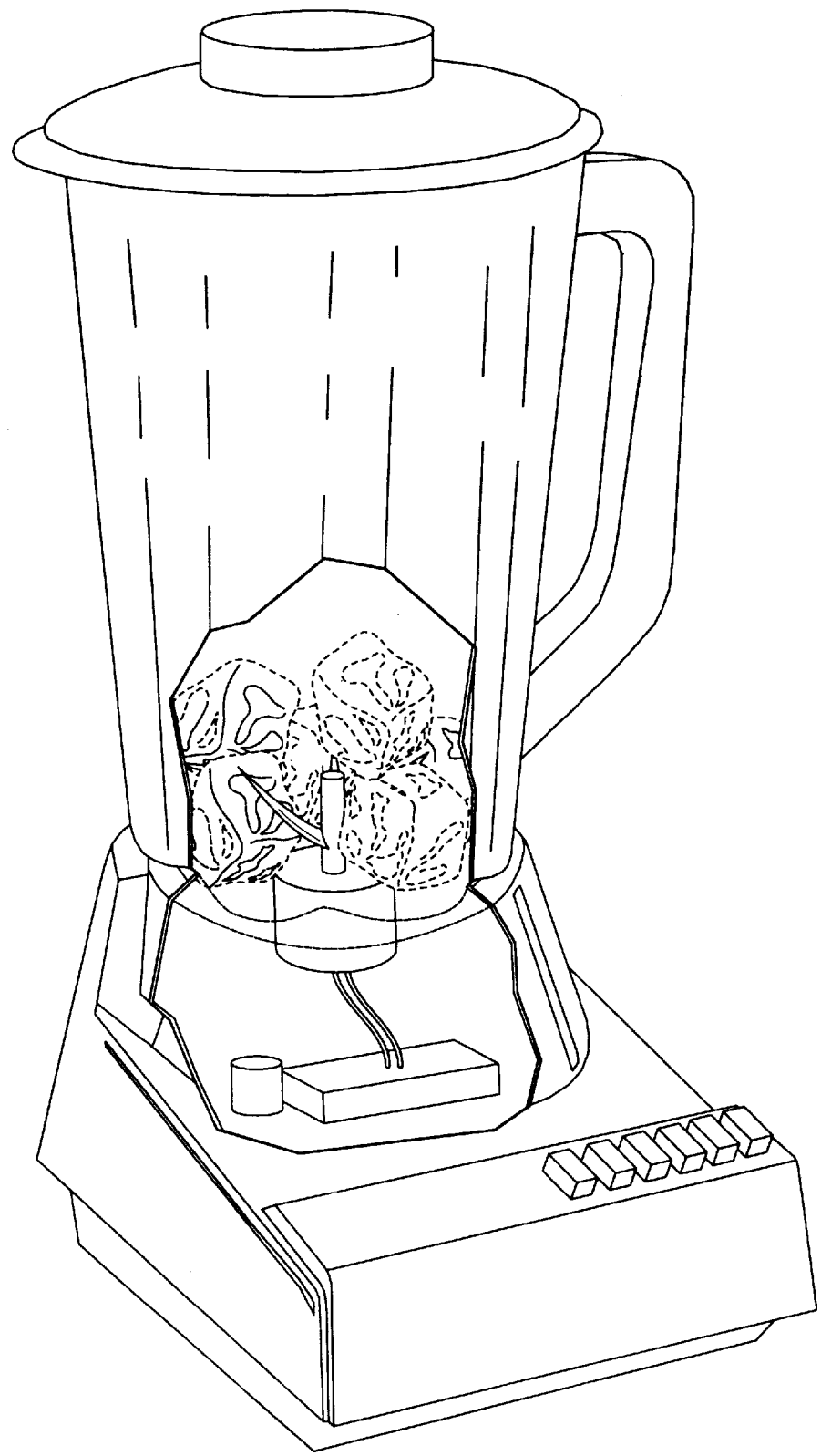

As indicated above, the reluctance machine system and control methods described herein have particular application to blenders and other devices where high starting torques are encountered. FIG. 12 generally illustrates a blender that has a chopping member coupled to a reluctance machine constructed according to the teaches of the present invention (e.g., the machine of FIG. 10A) that is energized by a circuit constructed according to the teachings of FIG. 11. The energizing circuit is preferable constructed on a board that is positioned within the base of the blender.

What has been described is an improved dynamoelectric machine which is a single-phase switched reluctance motor. The motor has at least one, and preferably two, auxiliary coils to facilitate starting the motor. The auxiliary coils are energized while the motor is off to align a rotor of the motor with the auxiliary coils with a reluctance torque to help reduce the starting torque required to start the motor. The auxiliary coils may also be energized to produce a reluctance torque to restart a motor that has stopped, because the torque provided by the stator coils in not sufficient for a particular application. The auxiliary coils are switched out of the motor circuit, after the motor is started or restarted since they are not required during normal operation of the motor. Alignment of the rotor enables a phase winding of the motor to produce sufficient torque to start the motor, this level of torque being less than would otherwise be required to start the motor. Utilizing the torque of the auxiliary coils to restart a stuck motor allows for automatic restart of the motor. In addition, the motor can have stepped air gap and shifted pole construction. This evens out the available torque over the widest angle the auxiliary coils can produce, and helps realign the rotor. Because the auxiliary coils are not used to run the motor in one embodiment, they require less copper than the other phase windings of the motor. Consequently, the motor is less expensive motor than a two-phase motor having similar operating performance because electronic switches and rotor sensors required with a two-phase motor are not required.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A switched reluctance machine comprising:
   a stator assembly including a stator defining a plurality of stator poles;
   a rotor mounted on a shaft and positioned for rotation relative to the stator, the rotor defining a plurality of rotor poles;
   a stator winding installed on the stator assembly, the stator winding being adapted to be energized during normal operation of the machine to produce rotation of the rotor, the stator winding having a first given number of ampere-turns; and an auxiliary starting winding installed on said stator assembly, the auxiliary starting winding being adapted to be energized to produce rotation of the rotor towards a position where the inductance of the auxiliary winding is maximized, the auxiliary starting winding having a second given number of ampere-turns, wherein the second given number of ampere-turns is greater than the first given number of ampere-turns such that, when energized with the same peak current, the torque produced on the rotor by energization of the auxiliary starting winding is greater than the torque produced by energization of the stator winding.

2. The switched reluctance machine of claim 1 wherein:

the stator winding comprises a plurality of coils and each stator winding coil is positioned about a stator pole, each stator pole defining a base, each base defining a width; and the auxiliary winding comprises a plurality of coils and each auxiliary winding coil is positioned about a stator pole;

and wherein the bases of the stator poles about which the auxiliary winding coils are positioned are reduced with respect to the bases of the stator poles about which the stator winding coils are positioned, such that the widths of each base of each stator pole about which an auxiliary winding coil is wound is less than the width of each base of each stator pole about which a stator winding coil is wound.

3. The reluctance machine of claim 1 wherein the stator defines inter-pole stator slots and wherein each stator slot includes conductors from the stator winding and conductors from the auxiliary winding.

4. The reluctance machine of claim 3 wherein the portion of each stator slot that is filled by conductors from the stator winding is greater than the portion of the stator slot filled by conductors from the auxiliary winding.

5. The reluctance machine of claim 1 wherein the rotor poles have stepped outer faces to form a stepped air-gap with respect to the stator poles.

6. The reluctance machine of claim 1 wherein there are N rotor poles, N being an integer, and wherein the stator winding is adapted to energize N stator poles and the auxiliary winding is adapted to energize N stator poles.

7. The reluctance machine of claim 1 wherein the stator winding is a bi-filar winding.

8. A switched reluctance system comprising:

a reluctance machine including a rotor defining a plurality of rotor poles, a stator defining a plurality of stator poles, a single-phase winding positioned within the stator and adapted to be energized to establish rotation of the rotor, and an auxiliary winding positioned within the stator, the auxiliary winding being positioned such that energization of the auxiliary winding will energize at least one stator pole;

a first control circuit coupled to the single-phase winding to selectively energize the single-phase winding to establish rotation of the rotor in a desired direction with a given torque; and a second control circuit coupled the auxiliary winding to energize the auxiliary winding in such a fashion that the rotor tends to rotate to a position where at least some of the rotor poles are in alignment with the stator pole energized by the auxiliary winding with a given peak torque that is greater than the peak magnitude of the torque imparted on the rotor when the single-phase winding is energized.

9. The reluctance machine system of claim 8 wherein the first control circuit is adapted to selectively energize the single-phase winding in response to a signal representative of the position of the rotor relative to the stator.

10. The reluctance machine system of claim 8 wherein the second control circuit is adapted to energize the auxiliary winding for a predetermined period of time during start-up of the machine to ensure reliable starting of the machine.

11. The reluctance machine system of claim 8 wherein the second control circuit comprises circuitry for detecting that the rotor is not rotating during a time when the single-phase winding is being energized and circuitry to energize the auxiliary winding for a predetermined duration when it is determined that the single-phase winding is being selectively energized and the rotor is not rotating.

12. The reluctance machine system of claim 8 wherein the second control circuit comprises circuitry for detecting the angular position of the rotor and circuitry to energize the auxiliary winding until the rotor reaches a preferred aligned position.

13. The reluctance machine system of claim 8 wherein the first control circuit is coupled to a DC bus and includes a switchable element to provide power from the DC bus to the single phase winding and wherein the second control circuit is coupled to a source of AC power and wherein the second control circuit includes a switchable element to energize the auxiliary winding with AC power.

14. The reluctance machine system of claim 8 wherein the second control circuit comprises a relay.

15. A method of operating a single-phase reluctance machine, the machine comprising a rotor, a stator, a single-phase main winding positioned within the stator, and an auxiliary winding positioned within the stator, the method comprising the acts of:

receiving AC power from an AC power source;

converting the AC power to DC power and providing a DC power bus;

energizing the auxiliary winding with the AC power to cause rotation of the rotor towards a desired rotor position; and selectively energizing the single-phase main winding with power from the DC bus to establish rotation of the rotor relative to the stator.

16. The method of claim 15 wherein the act of energizing the auxiliary winding is performed upon start-up to position the rotor at a preferred starting position.

17. The method of claim 15 wherein the act of energizing the auxiliary winding is performed when it is determined that the rotor is not rotating during normal operation to impart a unjamming torque to the rotor.

18. The method of claim 15 wherein the act of energizing the auxiliary winding is performed to brake the motor.

19. A switched reluctance machine system comprising:

(i) a power controller; and (ii) a switched reluctance machine coupled to the power controllers the switched reluctance machine comprising:

a stator assembly including a stator having a central bore and a plurality of inwardly salient poles extending into said bore;

a rotor mounted on a shaft and installed in said central bore for rotation of said rotor relative to the stator, said rotor having a plurality of outwardly salient poles extending into said bore, there being an air gap between the respective outer ends of said stator and rotor poles;

stator windings installed on the stator assembly, said stator windings being energized by the power controller when said machine is running to produce a magnetic field producing a rotation of the rotor at a given peak torque; and an auxiliary winding installed on said stator assembly, said auxiliary winding being adapted to be energized by the power controller when the machine is not running to produce rotation of the towards a position where the inductance of the auxiliary winding is maximized to facilitate starting of the machine, the peak torque produced by energization of the auxiliary winding being greater than the peak torque produced by energization of the stator winding.

20. An improved blender comprising:

a chopping member;

a reluctance machine having a stator, a rotor mounted to a shaft and positioned to rotate relative to the stator, a single-phase winding positioned within the stator, and an auxiliary winding positioned within the stator, the chopping member being coupled to the rotor shaft;

a first control circuit for selectively energizing the single-phase winding to produce rotation of the rotor with a given average running torque; and a second control circuit for selectively energizing the auxiliary winding to produce a peak torque that tends to move the rotor to a desired position relative to the stator that is greater than the average running torque produced when the single-phase winding is energized.

\* \* \* \* \*

UNITED STATES PATENT AND TRADEMARK OFFICE
CERTIFICATE OF CORRECTION

PATENT NO. : 5,844,343
DATED : December 1, 1998
INVENTOR(S) : Gary Edward Horst

It is certified that error appears in the above-identified patent and that said Letters Patent is hereby corrected as shown below:

In column 15, line 7, after the words "rotation of the", please insert the word "rotor" therefor.

Signed and Sealed this

Twenty-seventh Day of July, 1999

Attest:

Q. TODD DICKINSON

*Attesting Officer*           *Acting Commissioner of Patents and Trademarks*